United States Patent [19]

Danko

[11] Patent Number: 4,507,815
[45] Date of Patent: Apr. 2, 1985

[54] PLATFORM BED AND CORNER CONNECTOR

[75] Inventor: Peter Danko, Alexandria, Va.

[73] Assignee: The Bed Store, Alexandria, Va.

[21] Appl. No.: 406,161

[22] Filed: Aug. 9, 1982

[51] Int. Cl.³ .......................... A47C 19/00; B25G 3/36
[52] U.S. Cl. ..................................... 5/400; 5/282 R;
403/403; 403/402; 403/205
[58] Field of Search ............... 5/400, 401, 411, 282 R, 5/296, 304, 201, 451, 308; 403/403, 205, 402, 294, 295, 232.1

[56] References Cited

U.S. PATENT DOCUMENTS

| | | | |
|---|---|---|---|
| 3,188,664 | 6/1965 | Goldberg | 5/282 R |
| 3,736,605 | 6/1973 | Klein | 5/401 |
| 3,737,925 | 6/1973 | Oxford | 5/308 |
| 3,761,971 | 10/1973 | Behnke | 5/282 R |
| 4,073,019 | 2/1978 | Fraser | 5/451 |
| 4,077,074 | 3/1978 | Fogel | 5/451 |
| 4,197,602 | 4/1980 | Johenning | 5/286 |

FOREIGN PATENT DOCUMENTS

| | | | |
|---|---|---|---|
| 1192293 | 5/1970 | Belgium | 49/472 |
| 647691 | 8/1962 | Canada | 403/402 |
| 2062159 | 5/1981 | United Kingdom | 403/403 |

Primary Examiner—Alexander Grosz
Assistant Examiner—Vinh Luong
Attorney, Agent, or Firm—William D. Stokes

[57] ABSTRACT

A platform bed having a pedestal portion supporting a platform portion upon which the mattress is positioned; corner connectors are provided for connecting the side and end frame members of the pedestal and platform portions and transversely extending channel assemblies extend between the side frame members of the platform portion for supporting panel members upon which the mattress rests. The corner connectors and channel assemblies facilitate the assembly of the bed without the need for special tools or fasteners such as screws, bolts and the like.

13 Claims, 8 Drawing Figures

FIG.1
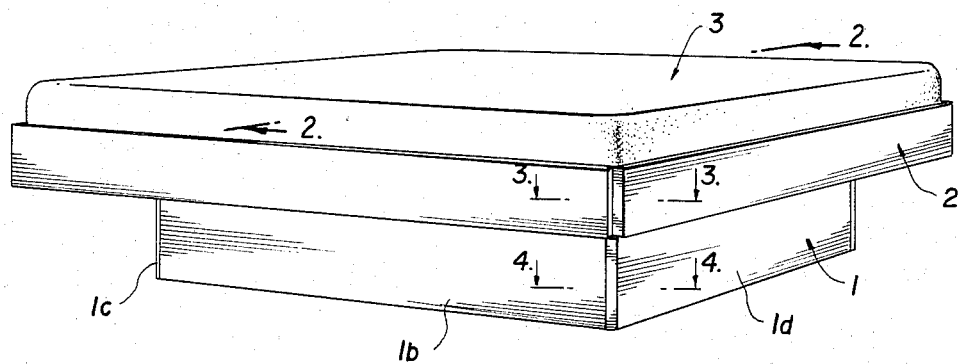
FIG.2
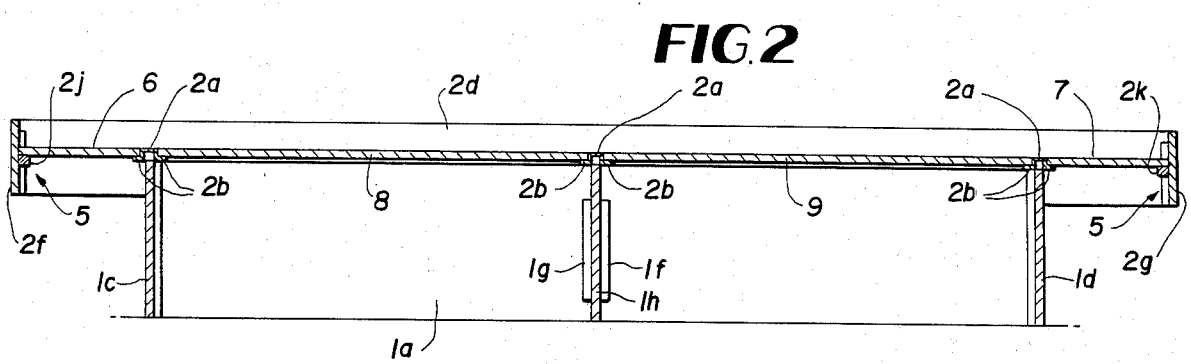
FIG.3
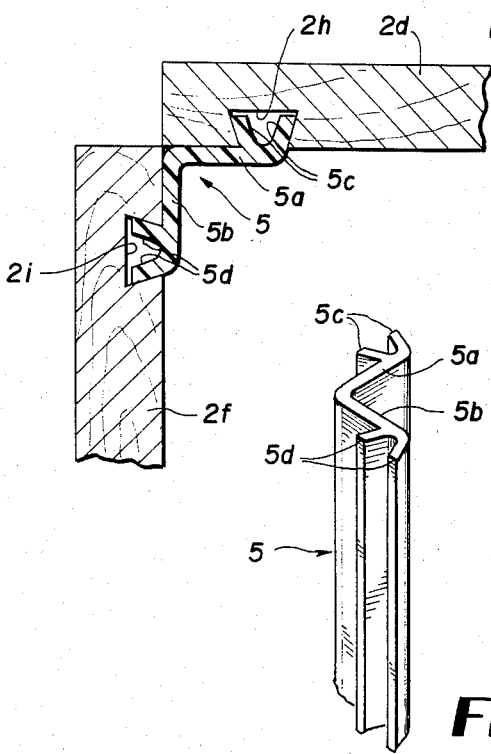
FIG.4
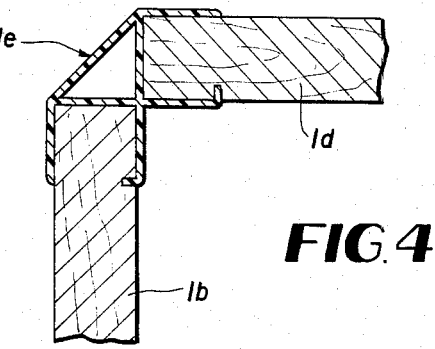
FIG.5

PLATFORM BED AND CORNER CONNECTOR

BACKGROUND OF THE INVENTION

In today's need for more space-efficient furniture for use in homes having limited living quarter space, particularly bedroom space, the platform bed has become increasingly popular. The conventional platform bed usually consists of a pedestal portion which sits on the floor of the bedroom and totally encloses the floor space upon which it rests, and a platform portion which is supported by the pedestal portion in an elevated position above the floor; the conventional box spring and mattress combination or mattress along being supported by the platform portion. The pedestal and platform portions of the bed include side and end frame members connected by suitable coupling members to form a rectangular structure. Heretofore, the coupling members have included fasteners such as screws, bolts, nails and the like, which required special tools and some expertise in carpentry on the part of the assembler in handling the tools to construct the bed.

In order to facilitate the assembly or disassembly of platform beds by a person having limited carpentry or mechanical ability, the platform bed of the present invention has been devised and comprises, essentially, the conventional pedestal and platform portions having corner connectors for frictionally connecting the side and end frame members to each other. A novel corner connector is provided for connecting the side and end frame members of the platform portion of the bed, and a plurality of transversely extending channel members extend between the side frame members of the platform portion for supporting a plurality of horizontally disposed panel members upon which the box spring and/or mattress are supported.

By the construction and arrangement of the platform bed of the present invention, the various components can be easily connected without the need for any tools, resulting in a rigid structure which maintains its rigidity even after many times of assembly and disassembly.

BRIEF DESCRIPTION OF THE DRAWINGS

FIG. 1 is a perspective view of the platform bed of the present invention;

FIG. 2 is a view taken along line 2—2 of FIG. 1;

FIG. 3 is a view taken along line 3—3 of FIG. 1;

FIG. 4 is a view taken along line 4—4 of FIG. 1;

FIG. 5 is a perspective view of the novel connector of the present invention;

DETAILED DESCRIPTION

Figure 6:
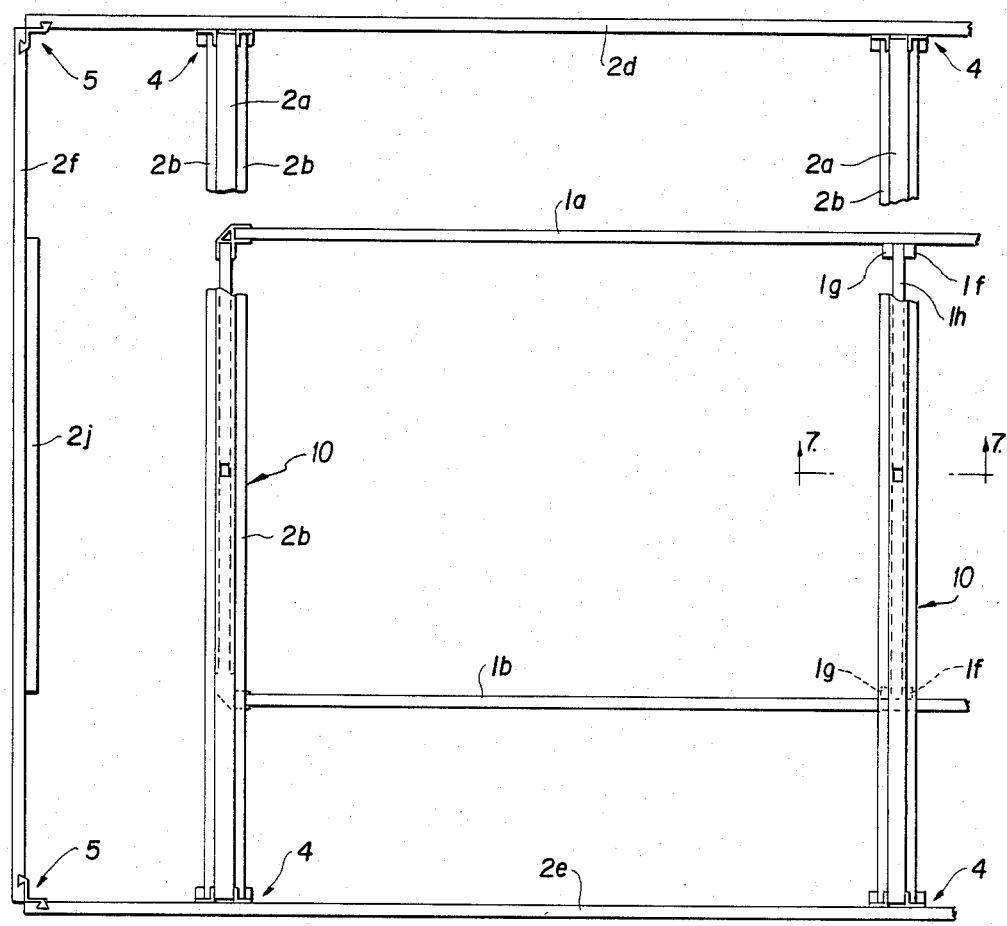
FIG. 6 is a fragmentary, top plan view of the pedestal and platform frame members.

Referring to the drawings and more particularly to FIG. 1 thereof, the platform bed of the present invention comprises a pedestal portion 1, a platform portion 2, which is supported in an elevated position above the floor by the pedestal portion, and a box spring and/or mattress combination 3 which is supported by the platform portion 2.

As will be seen in FIGS. 2, 4 and 6, the pedestal portion 1 comprises a pair of spaced, parrallel, longitudinally extending side frame members 1a, 1b and a pair of spaced, parallel, transversely extending end frame members 1c, 1d, the ends of the side frame members being connected to a respective end of the end frame members by a conventional corner connector 1e, of the type shown in U.S. Pat. No. 3,989,397, to thereby form a rectangular structure. The inner surfaces of the longitudinally extending frame members 1a, 1b are provided with spaced strip members 1f, 1g forming a track or groove for receiving a transversely extending partition 1h.

Referring to FIGS. 2, 3 and 6, the platform portion 2 of the bed comprises, a plurality of transversely extending, inverted channel members 10 having flange portions 2b. The inverted channel members 10 are seated on the top edges of the pedestal end frames 1c and 1d and the partition 1h, and the web portion 2a of each channel member is provided with a depending tab member 2c which is received in a correspondingly shaped slot 1i provided in the top edges of the end frame members 1c, 1d and partition 1h, to thereby prevent the channel members from sliding transversely when mounted in the operative position.

Figure 7:
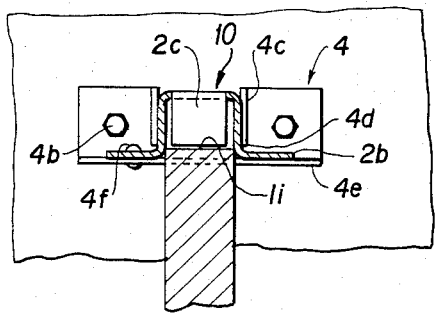
FIG. 7 is a view taken along line 7—7 of FIG. 6.
Figure 8:
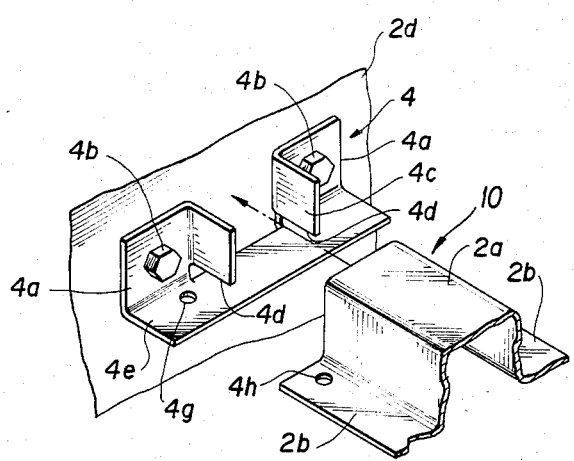
FIG. 8 is a perspective view showing the assembly of an end of a channel member on a bracket on a side frame member.

As will be seen in FIGS. 6, 7 and 8, the ends of each transversely extending channel member are adapted to be supported by brackets 4 secured to the inner faces of a pair of spaced, parallel, longitudinally extending frame members 2d, 2e forming a part of the platform portion 2. Each bracket 4 comprises a right angle member having the vertical leg 4a fastened to the respective side frame 2d, 2e by suitable fasteners 4b. A pair of spaced, parallel ears 4c are integrally connected to the leg 4a and extend normal thereto inwardly from the inner face of the side frame. The lower edges 4d of the ears 4c are spaced above the horizontal leg portion 4e of the bracket 4, for frictionally receiving the flange portions 2b of the channel member 2a, and the ears 4c are spaced sufficiently from each other to frictionally receive the legs of the inverted channel therebetween, as shown in FIG. 7.

In order to hold the channels 2a and brackets 4 in frictional engagement, a pin 4f can be inserted through aligned apertures 4g, 4h provided in the horizontal leg 4e of the bracket 4 and the flange portion 2b of the channel, respectively.

To complete the construction of the platform portion 2 of the bed, as will be seen in FIGS. 2, 3, 5 and 6, a pair of spaced, parallel, transversely extending end frame members 2f and 2g are connected to the ends of the longitudinally extending frame members 2d, 2e by novel corner connectors 5. Each corner connector comprises a one-piece member having a body portion including a pair of arms 5a, 5b disposed at a right angle to each other to conform to the inside corner of the platform portion formed by the side frames 2d, 2e and adjacent end frames 2f and 2g. The outer edges of each of the arms 5a, and 5b are provided with a pair of divergent or V-shaped fingers 5c, 5d, the major axis thereof extending normal to the longitudinal axis of the respective arms. The divergent fingers 5c, 5d are slidably received within corresponding-shaped grooves or recesses 2h, 2i formed in the platform portion side and end frame members, and are frictionally retained therein to hold the side and end frame members together.

Referring to FIGS. 2 and 6, shelf members 2j, 2k are secured to the inner faces of the end frame members 2f and 2g, respectively. A panel 6 is positioned on the shelf member 2j and oppositely facing flange portion 2b of the adjacent channel member, and another panel 7 is similarly mounted on the opposite end of the platform portion by being seated on the shelf 2k and adjacent flange portion 2b. Additional panels 8 and 9 are supported by the remaining flange portions 2b of the inverted channels 10, all the panels extending transversely between the side frame members 2d, 2e to thereby provide a horizontal surface for supporting the mattress assembly 3.

To assemble the platform bed of the present invention, the pedestal portion 1 is first constructed employing the corner connectors 1e for connecting the side and end frame members 1a, 1b, 1c, 1d. The partition 1b is then inserted into the track formed by the strips 1g, 1f. The inverted channel members 10 are then mounted on the top edges of the end frames 1c, 1d and partition 1h in such a manner that the depending tabs 2c are received in the respective slots 1i. The platform side frames 2d, 2e and associated brackets 4 are then connected to the ends of the channel members 10 as shown in FIGS. 7 and 8. The platform portion end frames 2f and 2g are then connected to the side frames 2d, 2e by inserting the corner connectors 5 vertically into the recesses. For convenience, the arm 5b may be affixed to the end frame 2f so that both the end frame 2f and connector 5 are moved in a vertical direction to connect the end frame to the side frames.

After the platform side and end frames are connected, the panels 6, 7, 8 and 9 are positioned as shown in FIG. 2 to provide a horizontal surface for receiving the mattress assembly 3.

From the above description, it will be readily apparent to those skilled in the art that the construction and arrangement of the various components of the platform bed of the present invention results in a construction which facilitates the assembly and disassembly of the bed without the necessity of screws, nails, adhesive or the use of special tools, and provides a platform bed which is sturdy in construction and not likely to get out of order even after long and continued use.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A platform bed comprising a pedestal portion, a platform portion supported by said pedestal portion and a mattress assembly supported by said platform portion; said pedestal portion comprising a pair of spaced, parallel, longitudinally extending side frame members, a pair of spaced, parallel, transversely extending end frame members, corner fastening means connecting adjacent ends of said side and end frame members, partition means positioned intermediate the end frame members and extending between the side frame members, means connecting the opposite end of said partition means to a respective side frame member; said platform means comprising a pair of spaced, parallel, longitudinally extending side frame members, a pair of spaced, parallel, transversely extending end frame members, corner fastening means connecting adjacent ends of said platform side and end frame members, said fastening means having a body portion including a pair of arms disposed at a right angle to each other to conform to the inside corner platform portion formed by the side and end frames, a pair of divergent fingers formed on the outer edges of each arm, the major axis of said divergent fingers extending normal to the longitudinal axis of the respective arms, groves formed in the platform side and end frame members, said divergent fingers being slidably received in said groves and frictionaly retained therein, panel support means connected to the pedestal end frame members, the partition, the platform side and end frame members, and panel means mounted on said support means forming a horizontal surface, said mattress assembly being supported on said panel means.

2. A platform bed according to claim 1, wherein the means for connecting the opposite ends of said partition means to said pedestal longitudinal frame members comprises track means mounted on the inner surfaces of said pedestal longitudinal frame members for slidably receiving the ends of said partition means.

3. A platform bed according to claim 1, wherein one of the fastening arms is affixed to the inner surface of one of the platform frame members.

4. A platform bed according to claim 1, wherein the panel support means connected to the pedestal end frame members and partition comprises transversely extending inverted channel members having flange portions, each channel member being positioned such that the flange portions of the channel member are disposed on opposite sides of the pedestal end frame members and partition with the web portion of the channel member being supported on the top edge of the frame members and partition.

5. A platform bed according to claim 4, wherein a depending tab is formed on the web portion of each channel member, a slot formed on the top edges of the pedestal end frames and partition, the tab in each channel being received in a corresponding slot to thereby prevent transverse movement of each channel member.

6. A platform bed according to claim 4, wherein bracket means are connected to the inner faces of the platform portion longitudinally extending frame members, the ends of said channel members being connected to said brackets.

7. A platform bed according to claim 6, wherein the bracket means comprises a right angle member having the vertical leg thereof secured to the respective platform longitudinal frame member, a pair of spaced, parallel ears integrally connected to said vertical leg and extending normal thereto inwardly from the inner face of said frame member, the lower edges of said ears being spaced above the horizontal leg of the right angle member for frictionally receiving the flange portions of the channel members, said bracket ears being spaced sufficiently from each other to frictionally receive the legs of the inverted channel therebetween.

8. A platform bed according to claim 7, wherein aligned apertures are formed in the horizontal leg of each bracket and the flange portion of each channel, a pin extending through said apertures for holding the channel members on the respective brackets.

9. A platform bed according to claim 4, wherein transversely extending shelf members are secured to the inner faces of the platform portion end frame members, a plurality of panel members being supported between said shelf members and channel member flange portions, to thereby provide said horizontal surface for said mattress assembly.

10. A corner connector device for joining the ends of a pair of frame members at an angle with respect to each other comprising a body portion having a pair of arms disposed at an angle to each other to conform to the desired inside angle of the frame members to be joined, a pair of divergent fingers formed in the outer end of each arm, the major axis of said divergent fingers extending at an angle to the longitudinal axis of the respective arms and adapted to be slidably received in grooves formed in the inner faces of the frame members and frictionally retained therein.

11. A corner connector according to claim 10, wherein the pair of arms are disposed at a right angle to each other.

12. A corner connector according to claim 10, wherein the major axis of said divergent fingers extend normal to the longitudinal axis of the respective arms.

13. A corner connector according to claim 10, wherein the divergent fingers and grooves are correspondingly shaped.

* * * * *